(12) United States Patent
Lomont et al.

(10) Patent No.: US 12,086,726 B2
(45) Date of Patent: *Sep. 10, 2024

(54) HYBRID CLUSTERED PREDICTION COMPUTER MODELING

(71) Applicant: MASTERCARD INTERNATIONAL INCORPORATED, Purchase, NY (US)

(72) Inventors: Thomas Lomont, Washington, DC (US); Sen Yang, Arlington, VA (US); Siyang Li, Arlington, VA (US); John Ingraham, Falls Church, VA (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 107 days.

This patent is subject to a terminal disclaimer.

(21) Appl. No.: 17/943,382

(22) Filed: Sep. 13, 2022

(65) Prior Publication Data

US 2023/0004842 A1   Jan. 5, 2023

Related U.S. Application Data

(63) Continuation of application No. 16/692,579, filed on Nov. 22, 2019, now Pat. No. 11,443,203.

(51) Int. Cl.
| | |
|---|---|
| *G06F 16/20* | (2019.01) |
| *G06F 16/2458* | (2019.01) |
| *G06F 16/28* | (2019.01) |
| *G06N 5/04* | (2023.01) |
| *G06N 20/00* | (2019.01) |

(52) U.S. Cl.
CPC ........... *G06N 5/04* (2013.01); *G06F 16/2474* (2019.01); *G06F 16/285* (2019.01); *G06N 20/00* (2019.01)

(58) Field of Classification Search
None
See application file for complete search history.

(56) References Cited

U.S. PATENT DOCUMENTS

| | | | |
|---|---|---|---|
| 6,826,724 B1* | 11/2004 | Shimada | G06F 16/313 707/E17.084 |
| 2019/0080415 A1* | 3/2019 | Kim | G06N 20/00 |
| 2019/0384790 A1* | 12/2019 | Bequet | G06F 16/9014 |
| 2020/0098465 A1 | 3/2020 | Jiang et al. | |
| 2020/0134484 A1* | 4/2020 | Hazard | G06N 5/04 |
| 2020/0177468 A1 | 6/2020 | Quachtran et al. | |
| 2020/0364596 A1 | 11/2020 | Zang et al. | |
| 2020/0387401 A1* | 12/2020 | Zhou | G06N 20/00 |

* cited by examiner

*Primary Examiner* — Jau Shya Meng
(74) *Attorney, Agent, or Firm* — FOLEY & LARDNER LLP

(57) ABSTRACT

Disclosed herein are systems and methods to efficiently execute predictions models to identify future values associated with various nodes. The systems and methods described herein retrieve a set of nodes and execute various clustering algorithms in order to segment the nodes into different clusters. The systems and methods described herein also describe generating one or more prediction models, such as time-series models, for each cluster of nodes. When a node with unknown/limited data and attributes is identified, the methods and systems described herein first identify a cluster most similar the new node, identify a corresponding prediction model, and execute the identified prediction model to calculate future attribute of the new node.

20 Claims, 6 Drawing Sheets

HYBRID CLUSTERED PREDICTION COMPUTER MODELING

CROSS-REFERENCE TO RELATED APPLICATIONS

This application is a continuation application of U.S. application Ser. No. 16/692,579, filed Nov. 22, 2019, which is incorporated herein by reference in its entirety for all purposes.

TECHNICAL FIELD

This application generally relates to generating more efficient and accurate computer modeling techniques.

BACKGROUND

In order to predict a future attribute of a node, conventional software solutions and computer modeling techniques rely on predictions models, such as time-series data models. Conventional software solutions, generate a time-series prediction model for all nodes within a dataset where the time-series prediction model uses previous attributes associated with different nodes to predict a future value/attribute of a particular node. However, conventional software solutions suffer from a technical problem. Conventional software solutions that utilize a holistic approach, where the time-series model is generated based on all nodes, do not produce accurate results. Time-series models generated based on all nodes are not accurate for all node segmentations because they predict a holistic value based on all nodes and not peculiar attributes of each node or each segment of the nodes. Therefore, the results generated using holistic time-series modeling techniques tend to identify an overall trend of all nodes, which are not specific to a particular node or a particular segment of nodes.

Technical solutions directed towards solving the above-described technical problem have not been satisfactory. In order to remedy the technical problem identified above, conventional software solutions must generate more granular time-series models. For instance, conventional software solutions generate a time-series model for each node and execute multiple time-series models to identify a future attribute of a given node. This solution is undesirable because it requires heavy computing power because a central server must first generate and then execute a multitude of computer models. Furthermore, generating time-series models on individual nodes may "over fit" data variations (e.g., noise) and may lead to inaccurate results. Therefore, conventional solutions to the technical problems faced by conventional software solutions are inadequate. Some conventional software solutions require an administrator to identify a time-series model to be execute for a particular node. Even though this solution produces more accurate results, it requires human intervention and is heavily reliant upon each administrator's subjective skills and understanding. Therefore, this solution is also unreliable and inadequate.

SUMMARY

For the aforementioned reasons, there is a need for an efficient and novel method to identify a future attribute of a node (within a set of nodes) by generating a limited number of prediction models and executing the time-series models in an optimized and efficient manner, without executing unnecessary models and without requiring heavy computing power. What is needed is a hybrid method that generates and executes prediction models based on clustering algorithms. It is also desired to have a solution that is efficient, timely, and not reliant upon human intervention. Disclosed herein are systems and methods capable of addressing the above-described technical shortcomings and may also provide any number of additional or alternative benefits and advantages.

In an embodiment, a method comprises receiving, by a server from an electronic device, a request to determine a future value of a first attribute associated with a first node; retrieving, by the server, one or more values corresponding to one or more attributes of the first node; retrieving, by the server from a database, a set of nodes and each node's values corresponding to the first attribute and the one or more attributes; executing, by the server, a clustering computer model to generate a plurality of clusters for the set of nodes where each cluster comprises a subset of nodes, whereby the clustering computer model determines each subset of nodes within each cluster in response to receiving each node's values corresponding to at least one attribute; generating, by the server, a prediction computer model for each subset of nodes within each cluster based on each node's value corresponding to the first attribute and a corresponding time value and each node's values corresponding to the one or more attributes and one or more corresponding time stamps; identifying, by the server, a cluster associated with the first node; executing, by the server, a prediction model corresponding to the identified cluster, the server inputting at least one value corresponding to the one or more attributes of the first node to calculate the future value of the first attribute for the first node; and populating, by the server, a graphical user interface on the electronic device with the calculated future value of the first attribute.

In another embodiment, a computer system comprises an electronic device configured to generate and transmit a request to determine a future value of first attribute associated with a first node; a database configured to store data associated with a set of nodes; a server in communication with the database and the electronic device, the server configured to receive, from the electronic device, the request to determine a future value of a first attribute associated with the first node; retrieve one or more values corresponding to one or more of the first node; retrieve, from the database, a set of nodes and each node's values corresponding to the first attribute and the one or more attributes; execute a clustering computer model to generate a plurality of clusters for the set of nodes where each cluster comprises a subset of nodes, whereby the clustering computer model determines each subset of nodes within each cluster in response to receiving each node's values corresponding to at least one attribute; generate a prediction computer model for each subset of nodes within each cluster based on each node's value corresponding to the first attribute and a corresponding time value and each node's values corresponding to the one or more attributes and one or more corresponding time stamps; identify a cluster associated with the first node; execute a prediction model corresponding to the identified cluster, the server inputting at least one value corresponding to the one or more attributes of the first node to calculate the future value of the first attribute for the first node; and populate a graphical user interface on the electronic device with the calculated future value of the first attribute.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate an embodiment of the invention and together with the specification, explain the invention.

DETAILED DESCRIPTION

Figure 1:
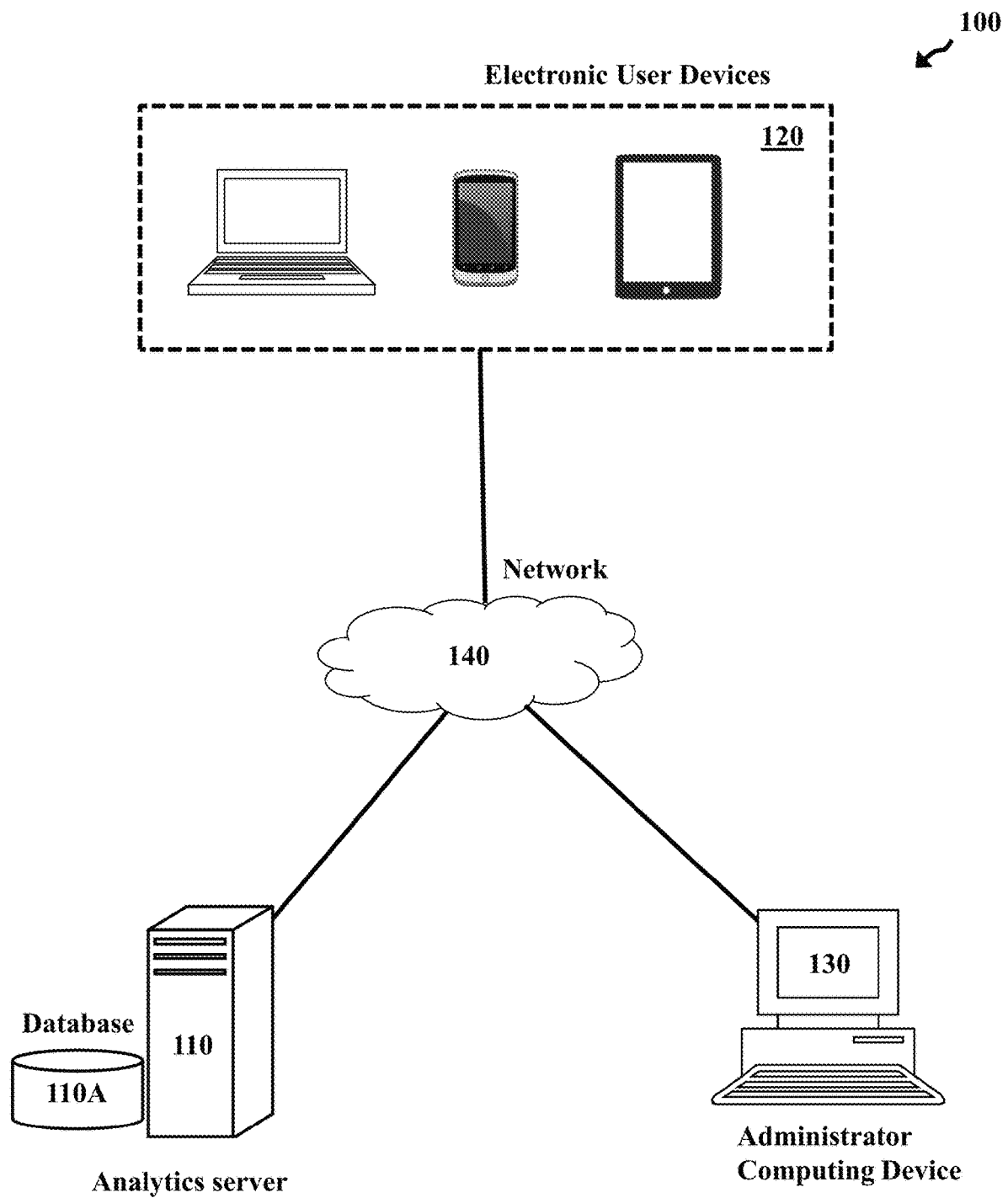
FIG. 1 illustrates a computer system for predicting future attributes leveraging hybrid clustering and time-series modeling techniques, according to an embodiment.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

FIG. 1 illustrates components of a system 100 for predicting future attributes leveraging hybrid clustering and time-series modeling techniques, according to an embodiment. Even though some embodiments herein describe the prediction models as time-series models or time-series prediction models, it is expressly understood that prediction modeling is not limited to time-series models. Methods and systems described herein can use any prediction computer modeling technique to calculate future attributes of different nodes. The system 100 may comprise an analytics server 110 with a database 110A, a set of electronic user devices 120, and an administrator computing device 130. The computing features described above are connected via a network 140. Examples of the network 140 include, but are not limited to, Local Area Network (LAN), Wireless Local Area Network (WLAN), Metropolitan Area Network (MAN), Wide Area Network (WAN), and the Internet. The communication over the network 140 may be performed in accordance with various communication protocols, such as Transmission Control Protocol and Internet Protocol (TCP/IP), User Datagram Protocol (UDP), and IEEE communication protocols.

The analytics server 110 may be any computing device comprising a processor and other computing hardware and software components, configured to perform the various tasks described herein. The analytics server 110 may be logically and physically organized within the same or different devices or structures. The analytics server 110 may be distributed across any number of physical structures and locations (e.g., cabinets, rooms, buildings, and cities). In operation, the analytics server 110 may receive a request from the administrator computing device 130 or any of the electronic user devices 120 to determine a future attribute of a node. The request may require the analytics server 110 to retrieve known user data from the database 110A storing the user data, such as user accounts, customer transactions and other relevant data. The database 110A may comprise a set of nodes corresponding to a set of user data from which the analytics server 110 may generate a predicted attribute for a node not included in the database 110A (or not a part of the nodes with known data). In a non-limiting example, a client my request the analytics server 110 to analyze data associated with a set of existing users to predict a new user's future attributes.

The administrator computing device 130 may be any computing device allowing a client to interact with the analytics server 110. The administrator computing device 130 may be any computing device comprising a processor and non-transitory machine-readable storage medium. The examples of the computing device may include, but are not limited to, a desktop computer, a laptop, a personal digital assistant (PDA), a smartphone, a tablet computer, and the like. The administrator computing device 130 may comprise any number of input and output devices supporting various types of data, such as text, image, audio, video, and the like.

The database 110A may be any non-transitory machine-readable media configured to store a set of nodes with known data, such as existing users and their account information. As used herein nodes may represent any unit of data or any category of data. For instance, the set of nodes stored within the database 110A may represent a set of users (existing customers), a set of electronic devices, and the like. When the set of nodes represent a set of users, each node represents a user and each node may be associated with data (attributes) corresponding to that particular user. For instance, each node may include metadata that corresponds to different attributes of each user, such as demographic data, account information, transaction history, and the like. User account information may comprise customer identifiers, address, contact information (e.g., email address, phone number), and demographic data (e.g., age, gender, income, and location), and the like. The transaction information may comprise each user's historical transactions and a corresponding category and/or timestamp, transaction data, transaction items, transaction amount, payment methods, and the like.

Additionally or alternatively, each node may correspond to any arbitrary grouping of transactions. As described herein an "account" may refer to a single account of a user (e.g., a credit card owned by a user). However, an "account" may also correspond to all of the accounts known to be associated with a given user/customer. Furthermore, an "account" may correspond to all transactions at a predetermined location (e.g., same location, store). Accordingly, a node may represent any combination of user data including, transaction data and the like.

In some configurations, based on the set of nodes stored onto the database 110A and the corresponding data, the analytics server 110 may execute a clustering computer model to generate a number of clusters. In a non-limiting example, the clustering computer model may segment or group the set of nodes into a number of clusters based on one or multiple dimensions. For clustering purposes, each dimension may represent an attribute of the nodes within the set of nodes. The analytics server 110 may consider only one attribute when clustering (e.g., grouping or segmenting) different nodes into one or more clusters. For instance, the analytics server 110 may cluster/segment the set of nodes based on a single attribute of each node (e.g., age range, income range, or number of transactions per month). In that embodiment, each cluster of nodes may include nodes (users) that are within the predetermined age range (e.g., 25-35, 36-45, and 46-66).

In other embodiments, the analytics server 110 may cluster the set of nodes based on multiple dimensions (e.g., age range and income range). By executing the clustering computer model, the analytics server 110 may group similar nodes based on their respective attributes. Nodes (e.g., users) in the same cluster are more similar (e.g., with similar values for the set of attributes) to each other than to those in other clusters.

After executing clustering modeling and generating multiple clusters, the analytics server 110 may generate a prediction model for each cluster using attributes of the nodes within each particular cluster. An example of a prediction model is a time-series model. A time-series model comprises a series of data points corresponding to one or more attributes of each node indexed (or listed or graphed) in accordance with a time order. For instance, in a non-limiting example, a computer model may ingest data points for one or more attributes associated with each node within the set of nodes where the prediction computer model is generated based on a time-indexed value as an independent variable and the attribute data point serves as the dependent variable. When generating the model, the analytics server 110 may not distinguish between the independent and dependent attributes/variables. There may not be a difference between how an independent or dependent variable is described by the model. The analytics server 110 may treat all attributes the same and execute various analytical protocols to generate the model based on all attributes.

The analytics server 110 may use the time-series model to analyze attribute data points of each node, to extract meaningful characteristics of the data, and to predict future attribute data points. For instance, the analytics server may forecast and predict future values based on previously observed values. The analytics server 110 may use any regression algorithm to identify a trend and to predict the future value of a given node.

The electronic user devices 120 may be any computing device allowing a customer to interact with the analytics server 110. The electronic user devices 120 may be any computing device comprising a processor and non-transitory machine-readable storage medium. The examples of the computing device may include, but are not limited to, a desktop computer, a laptop, a personal digital assistant (PDA), a smartphone, a tablet computer, and the like. The electronic user devices 120 may comprise any number of input and output devices supporting various types of data, such as text, image, audio, video, and the like. The electronic user devices associated with the test customers may receive the promotional materials. A customer/user operating the electronic user device 120 may transmit a request to the analytics server 110 where the analytics server 110 performs a variety of analytics and predicts future values of a node (e.g., user).

The analytics server 110 may generate and display a user interface on the electronic user devices 120, where a user operating the electronic user device 120 can input the request to identify future values, their attributes, and identification of different nodes. For instance, a user can operate an electronic user device 120 to transmit a request to the analytics server 110. As will be described below, the request may identify a user (e.g., customer) and instruct the analytics server 110 to calculate a future value of an attribute of identified the user. For instance, the request may identify a new user and his/her attributes (e.g., age, sex, location, income level) and may also instruct the analytics server 110 to analyze data for existing users (and historical data) to predict how much the user will spend within the first six month of opening his/her account.

Upon receiving the request, the analytics server 110 may then calculate the future value requested and display the result on a graphical user interface displayed on the electronic user devices 120. An example of the graphical user interface generated and hosted by the analytics server 110 may be a website. The analytics server 110 may host a website accessible to end-users, where the content presented via the various webpages may be controlled based upon each particular user's role. Non-limiting examples of such computing devices may include workstation computers, laptop computers, server computers, laptop computers, and the like.

The analytics server 110 may execute software applications configured to display the user interface (e.g., host a website), which may generate and serve various webpages to electronic user devices 120 or the administrator computing device 130. The website may be used to generate and access data stored on the database 110A or the analytics results calculated by the analytics server 110. In some implementations, the analytics server 110 may be configured to require user authentication based upon a set of user authorization credentials (e.g., username, password, biometrics, cryptographic certificate, and the like). In such implementations, the analytics server 110 may access the database 110A20 configured to store user credentials, which the analytics server 110 may be configured to reference in order to determine whether a set of entered credentials (purportedly authenticating the user) match an appropriate set of credentials that identify/authenticate the user.

The request may be generate and transmitted to the analytics server 110 from either the administrator computing device 130 or the electronic user device 120. In some configurations, the administrator computing device 130 may monitor user requests received by the analytics server 110.

Figure 2:
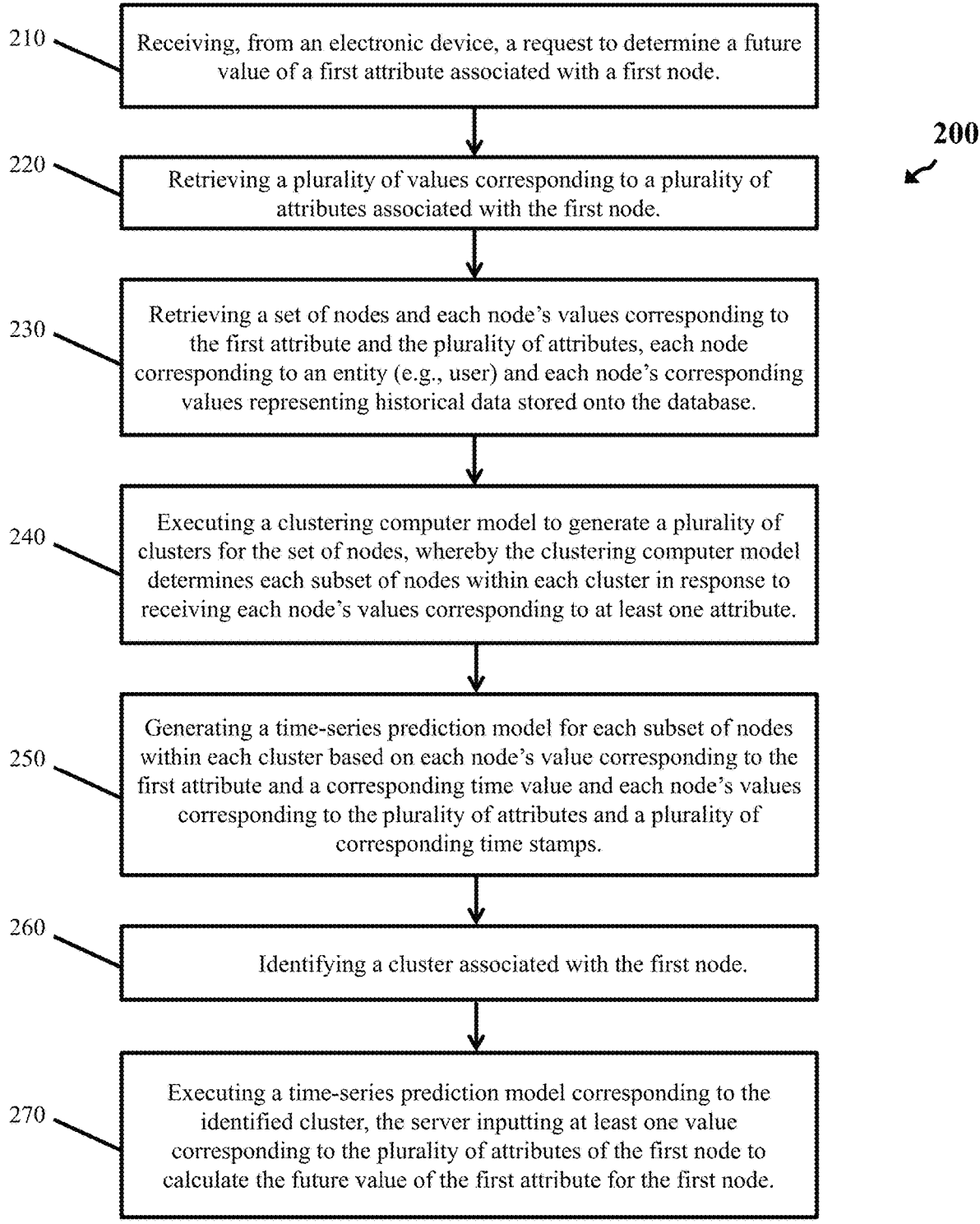
FIG. 2 illustrates a flowchart depicting operational steps for predicting future attributes leveraging hybrid clustering and time-series modeling techniques, according to an embodiment.

FIG. 2 illustrates execution steps of a method 200 for calculating a future value of a node by leveraging hybrid clustering and time-series modeling techniques, according to an embodiment. Other embodiments may comprise additional or alternative steps, or may omit some steps altogether. In the embodiment described below, the method 200 is performed by a server, such as the analytics server described in FIG. 1. However, in some configurations, the method 200 may be performed by multiple servers or computing devices, such as the computing features described in FIG. 1 or a distributed system architecture.

At step 210, the analytics server may receive, from an electronic device, a request to determine a future value of a first attribute associated with a first node. The analytics server may receive a request to predict an attribute (future or present) associated with a node. The request may comprise an identifier of the node. The identifier may be any indicator identifying the user/computing device associated with the node.

The analytics server may generate a graphical user interface in order to provide services to a variety of clients (e.g., administrator or users). In an embodiment, the graphical user interface may be a website hosted by the analytics server, which is available to different clients. The purpose of said website may be to provide a platform to securely upload data and/or send requests to the analytics server to predict future attributes of different nodes (users).

In some embodiments, the analytics server may also automatically receive the request from an electronic source with little or no human intervention. The analytics server may utilize an application-programming interface (API) to receive requests from different electronic sources. For example, an API locally installed on the administrator computing device and in direct communication with the analytics server may automatically transmit one or more (e.g., batch) requests to the analytics server.

At step 220, the analytics server may retrieve, from a database, at least one or more values corresponding to one or more attributes associated with the first node. The analytics server may use the identifier received to identify the requested node. In response to identifying the requested node, the analytics server may then use the identifier to query attributes associated with the identified node. For instance, in an example where nodes represent different users, the analytics server may receive information associated with the user. In some configurations, the data received may not be any personally identifiable information (e.g., number of transactions). In some configurations, the data may be personally identifiable information (e.g., name or account number of a user). If the data is personally identifiable information, the analytics server may receive encrypted personally identifiable information of the user. For instance, the analytics server may receive hashed user name and/or account number (or any other known encryption methods). The analytics server may then use the user's name/account number to query an internal or external database to retrieve other relevant information, such as account information, transaction history, demographic data, and the like.

At step 230, the analytics server may retrieve, from the database, a set of nodes and each node's values corresponding to the first attribute and the one or more attributes, each node corresponding to a user and each node's corresponding values representing historical data stored onto the database. As describe above, in order to predict a future value of the identified node, the analytics server may first retrieve a set of nodes that represent existing users with known values (e.g., historical values). As will be described below, the analytics server may then execute various clustering and computer modeling techniques on the retrieved set of nodes to identify the future attribute value of the identified node.

In some configurations, the analytics server may select/ retrieve a set of nodes that correspond to the request and/or the first node's attributes. For instance, if the first node has a location attribute of Texas, the analytics server may retrieve a set of users (with known historical data) within Texas.

At step 240, the analytics server may execute a clustering computer model to generate a plurality of clusters for the set of nodes where each cluster comprises a subset of nodes, whereby the clustering computer model determines each subset of nodes within each cluster in response to receiving each node's values corresponding to at least one attribute. The analytics server may execute a clustering computer model using the set of nodes to generate one or more clusters to include similar users. As a result, each cluster may comprise one or more nodes. In a non-limiting example, the analytics server may calculate a multidimensional distance value between each node within the set of nodes where each dimension of the multidimensional distance represents an attribute different between two nodes. Therefore, each dimension may correspond to an attribute of each node within the set of nodes. The analytics server may assign a cluster to each node based on its respective distance to other nodes, and iteratively repeat calculating the distance value and assigning each node to a cluster until the distance values of nodes within each cluster satisfy a distance threshold. As a result, the nodes within each cluster may include similar nodes (e.g., all users within the same range of income level or same range of money spent within the last six months).

The analytics server may execute a clustering computer model using the set of nodes to generate a number of clusters based on multiple dimensions where each dimension corresponds to an attribute of each nodes within the set of nodes. The set of attributes may include prior spend in a predetermined period, days since last transaction, number of transactions in a certain period, demographic data (e.g., age, sex, income level, and education level), and any other relevant attributes. The analytics server may generate a number of clusters with each cluster including one or more nodes with similar values for the set of attributes.

By executing the clustering computer model, the analytics server may group the set of nodes (e.g., the set of customers/ users) into a number of clusters. Nodes (e.g., users) in the same cluster are more similar (in the sense of the set of attributes used to calculate the distance) to each other than to those in other clusters. For example, assuming the analytics server executes the clustering computer model based on three attributes including age, gender, and income level. The customers in each cluster may be within the same age range, with the same gender, and within the same income bracket.

In some embodiments, the analytics server may divide the set of nodes into a predetermined number of clusters (e.g., five or ten clusters). For example, the analytics server may receive a parameter for the number of clusters from an administrative user. The analytics server may iteratively execute the clustering computer model and only stop until the analytics server has reached the predetermined number of clusters. In some other embodiments, the analytics server may iteratively execute the clustering computer model and only stop until the distance values of nodes within each cluster satisfying a distance threshold. As a result, the number of clusters will not be predetermined. Alternatively, the analytics server may iteratively execute the clustering computer model until the distance values decreasing is less than a threshold or the distance values stop decreasing.

The distance between two nodes may represent a difference of two nodes (users) with respect to a single attribute. Therefore, in an example, a "spend-30 distance" between two nodes represents how similar the two nodes are with respect to spending money within the last 30 days. As described herein, the analytics server may utilize this distance to identify similar users and cluster the nodes accordingly. Furthermore, because the analytics server considers more than one attribute when assigning nodes to different clusters, the analytics server may generate the distance representing more than one attribute. The analytics server may utilize any distance calculating technique, such as the Euclidean distance or any other distance calculation method to generate the multidimensional distance value for each node.

In some embodiments, the analytics server may use a non-hierarchical clustering method, such as K-means algorithm, to generate a predetermined number of the clusters. For example, the analytics server may generate 10 clusters. The analytics server may start with an initial set of cluster centers. The initial set of cluster centers may be 10 nodes randomly chosen from the set of nodes. The analytics server may calculate the Euclidean distance between each node to each of the centers. The analytics server may minimize the within-cluster scatter, which is the average distance for every node to its cluster center. In Euclidean space, the within-cluster scatter is the sum of squared distances of each node to the cluster centers. Specifically, the analytics server may minimize the within-cluster scatter with the following two-step iterative process. In the first step, the analytics server may assign each node to its closest cluster center. In the second step, the analytics server may calculate the average location of all the nodes assigned to each cluster and move the cluster center to the average location (e.g., readjust the data point). By repeating this process, the analytics server may iteratively reassign the nodes to more appropriate clusters until either the algorithm converges or the within-cluster scatter reaches a minimum distance value (e.g., stops decreasing).

The clustering algorithm implemented in the clustering computer model may be K-means clustering, mean-shift clustering, density-based spatial clustering of applications with noise, expectation-maximization clustering, hierarchical clustering, and any other clustering algorithms.

At step 250, the analytics server may generate a predictions mode (e.g., time-series prediction model) for each subset of nodes within each cluster based on each node's value corresponding to the first attribute and a corresponding time value and each node's values corresponding to the one or more attributes and one or more corresponding time stamps. The analytics server may use a variety of programming languages to generate a time-series forecasting computer model. As described above, each time-series model corresponds to one cluster. Therefore, the analytics server generates each time-series model based on nodes within each cluster and their corresponding attributes.

In some embodiments, the analytics server may generate multiple time-series models for each cluster where each time-series model corresponds to one attribute. The analytics server may retrieve all relevant data associated with the nodes within each cluster and may generate multiple clusters where each cluster is configured to predict a different attribute. For instance, the analytics server may generate a first time-series model that corresponds to number of transactions of each user within a cluster. The first time-series model may include historical number of transactions per a predetermined time period (e.g., day, month, quarter, or year). The time-series model can use various data analysis methods (e.g., linear/Poisson regression models) to identify a trend and predict a future number of transaction for any node. Similarly, the analytics server may generate a second time-series model for the same cluster where the time-series model corresponds to an overall amount spent by each node. Additionally or alternatively, the analytics server may also generate one or more time-series model that corresponds to more than one attribute. As will be described below, the analytics server can execute the time-series models to predict future values.

At step 260, the analytics server may identify a cluster associated with the first node. As described above, the analytics server may calculate a distance between the identified node and the users within different clusters. The analytics server may calculate the distance to identify a cluster of users that are most similar to the identified user. The analytics server may calculate the distance using the attribute(s) used to cluster the set of nodes. For instance, if the set of nodes are clustered based on age, then the analytics server may use "age" to identify a cluster of nodes most similar to the identified node. Therefore, if the analytics server clusters the set of nodes based on age, the analytics server may generate three clusters of users where the first cluster comprises users with an age range of 18-25, a second cluster comprising user with an age range of 26-45, and a third cluster comprising users with an age range of 46-80.

When the analytics server identifies that the identified user corresponding to the first node (step 210-210) is 48 years old, the analytics server determines that the third cluster of users is the most similar cluster of users to the identified user.

At 270, the analytics server may execute a time-series prediction model corresponding to the identified cluster, the server inputting at least one value corresponding to the one or more attributes of the first node to calculate the future value of the first attribute for the first node. Upon identifying a cluster that is most similar to the first node, the analytics server may then retrieve a time-series model associated with the identified cluster and execute the retrieved time-series model in accordance with the first nodes' attributes (step 220). As a result, the analytics server may determine a future attribute associated with the first node. The analytics server may also populate a graphical user interface on the electronic device with the calculated future attribute of the first node.

In some configurations, multiple servers may perform the steps of the method 200. Accordingly, the analytics server may distribute one or more steps of the method 200 among multiple servers to increase efficiency. For instance, while the analytics server may retrieve the set of nodes, the analytics server may instruct a second server to cluster the nodes and/or generate the time-series models. Furthermore, the analytics server may instruct a third server to execute the time-series model in order to display the results. Some of the processes or execution steps described above may be simultaneously performed to increase efficiency.

Figure 5:
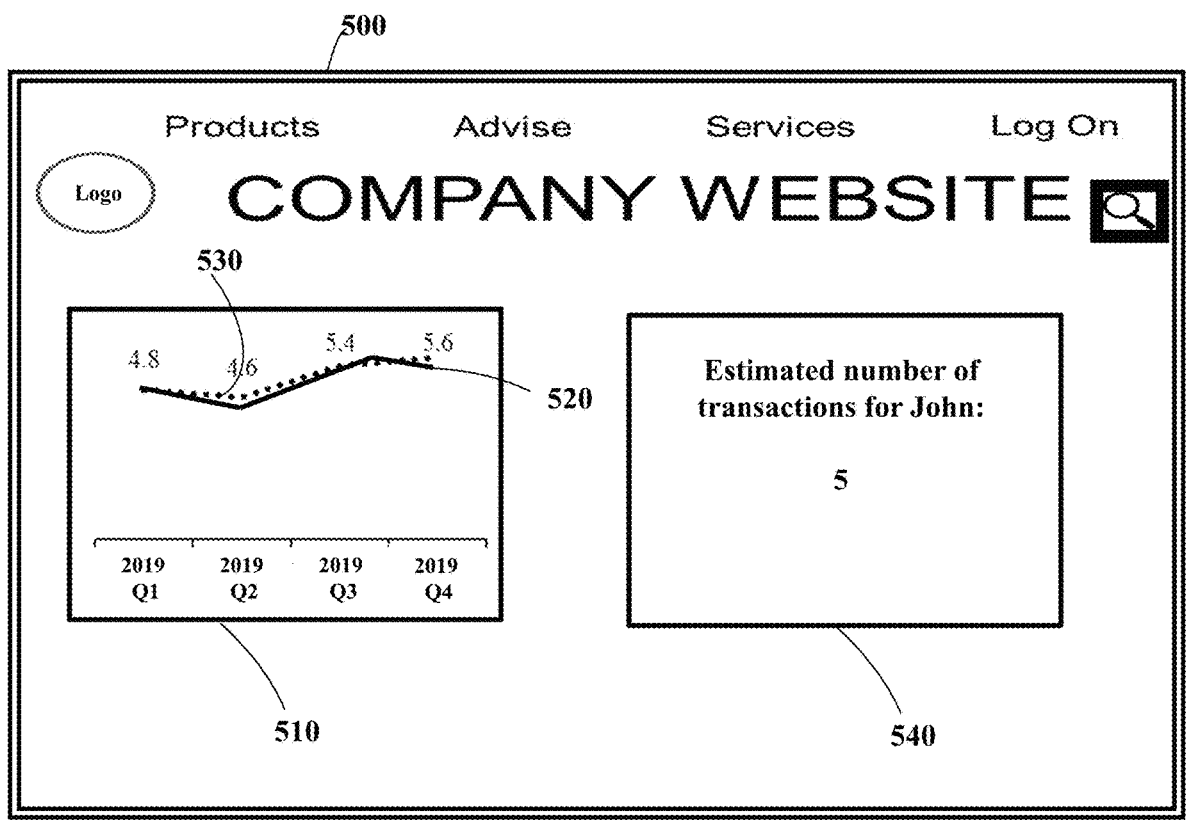
FIG. 5 illustrates an example of a graphical user interface displaying results of predicting future attributes leveraging hybrid clustering and time-series modeling techniques, according to an embodiment.

FIG. 5 depicts a graphical user interface displayed by the analytics server, according to an embodiment. The analytics server may populate a GUI 500 to display the results calculated using the methods and systems described above. An example of the GUI 500 may be a website. As described above, the analytics server may host a website accessible to different users where the website displays results of the methods and systems described herein. For instance, an end user may log in the website to submit a request to the analytics server. The request may include identification of the new user. The end user may directly input the new user's attributes using one or more input elements displayed on the GUI 500 (not shown). The website may also display the results as depicted in GUI 500.

In some embodiments, GUI 500 may be a website where only a portion of the website is populated by the analytics server. The website may contain code, such as HTML or PHP, presenting a website of any number of webpages having a common "look-and-feel." The code may also define one or more containers displaying information or data that is configured to be dynamically generated using ongoing analysis performed by the analytics server. The analytics server may populate the sub-interfaces or containers using the results of execution of the methods and systems describe herein, while the webpage display is configured to maintain the website's common aesthetic. Container 510 may include a graphical representation of the execution of one or more prediction models. For instance, as depicted, the analytics server may display a graph representing a number of transactions predicted for a new user (line 520). The analytics server may also display line 530 that displays a relative value for other existing users (e.g., number of transactions per existing user predicted for the same time periods). The analytics server may also populate container 540 with a numerical value that represents the results.

Figure 3A:
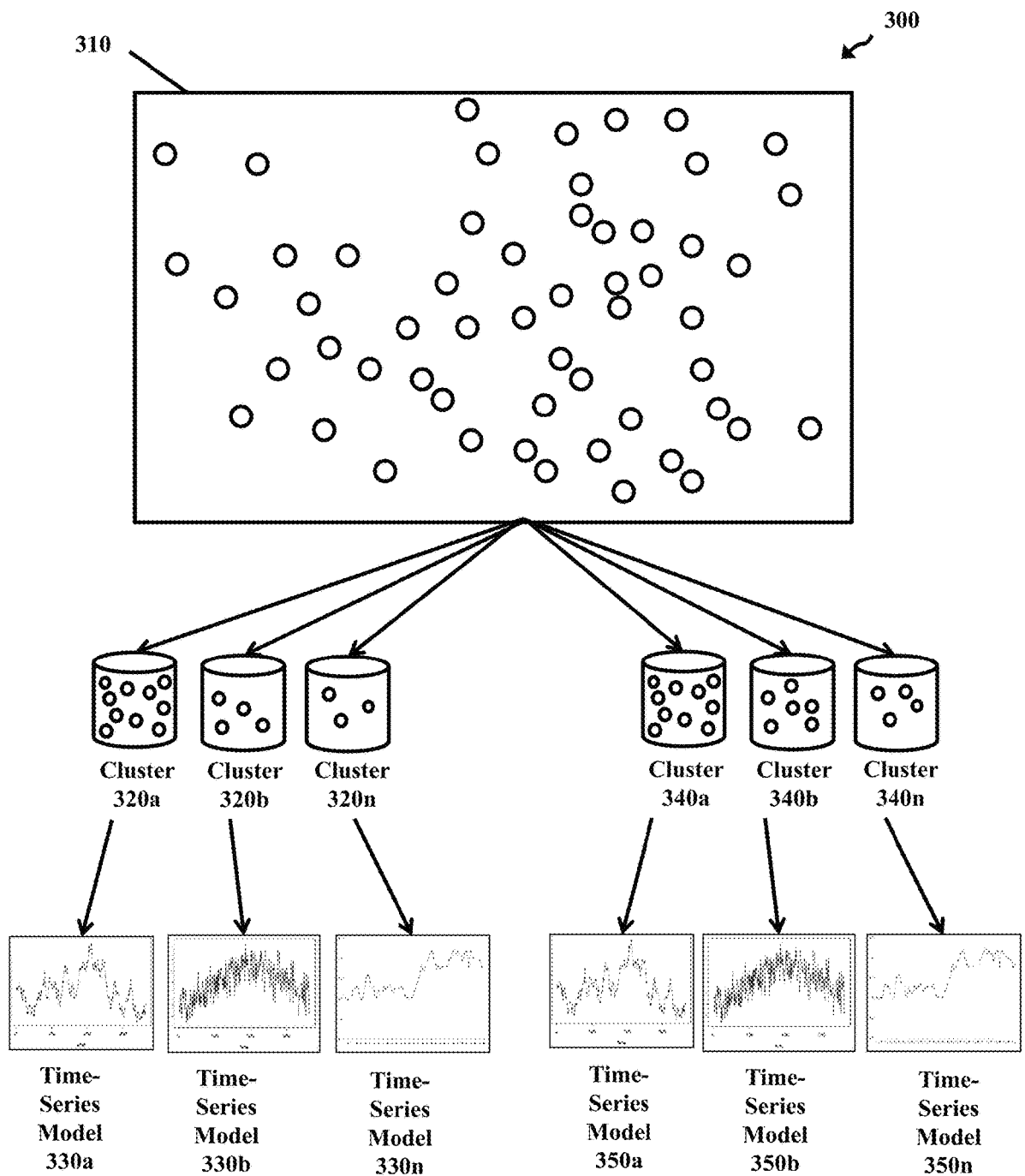
FIGS. 3A-B illustrate a non-limiting example of predicting future attributes leveraging hybrid clustering and time-series modeling techniques, according to an embodiment.
Figure 3B:
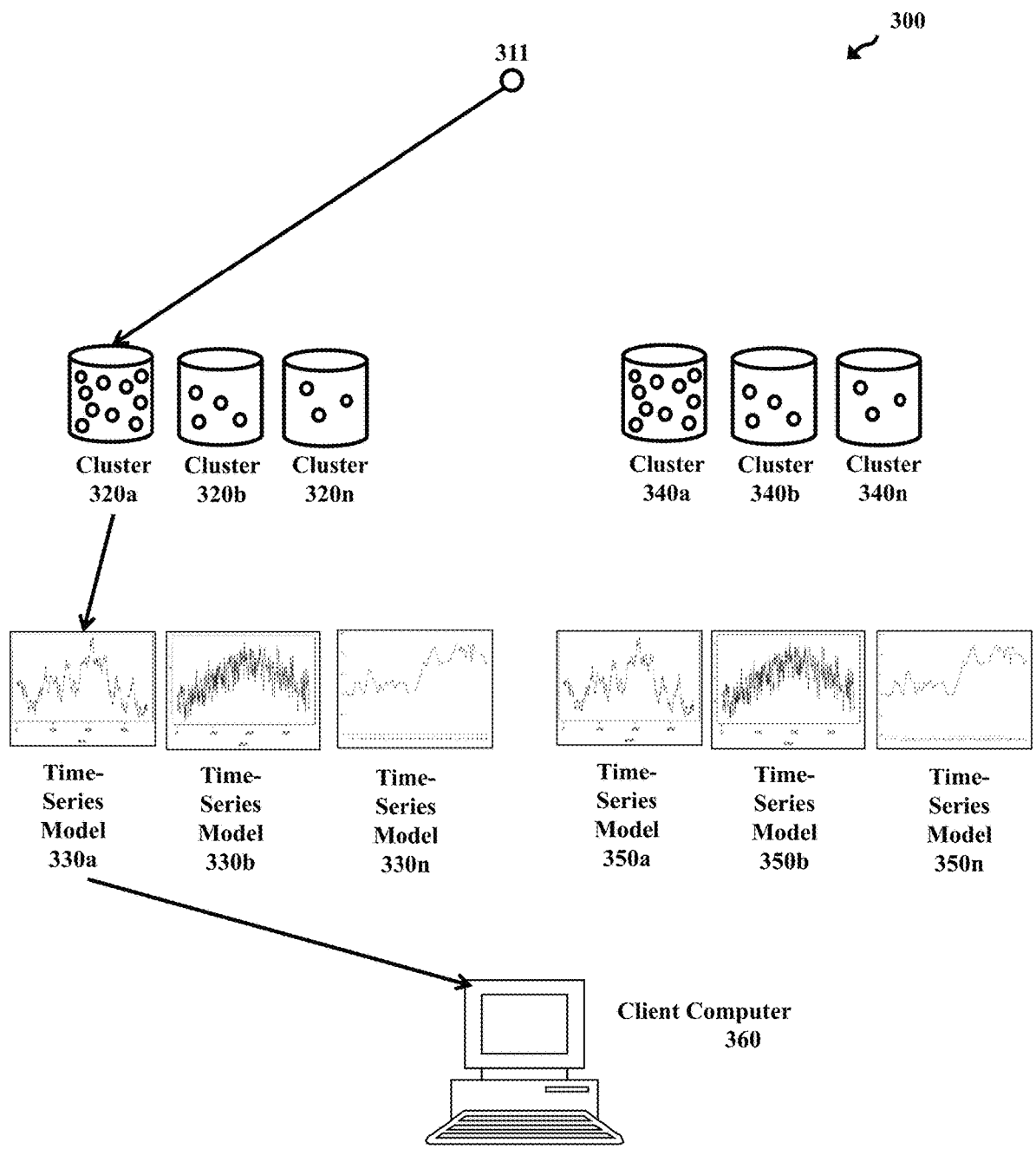

FIGS. 3A-B illustrate a non-limiting example of the operation of the methods and systems described herein.

Example 300 illustrates how a central server, such as the analytics server described herein, can efficiently execute one or more computer models to predict a future attribute for a node 311. In the example 300, the set of nodes 310 represents a set of customers, node 311 represents a particular user (new users), and the future attribute calculated is a future amount of money spent by the user represented by node 311. However, it is expressly understood that in other embodiments, the set of nodes may represent other data. For instance, each node may represent an electronic device. Therefore, the example 300 does not limit the methods and systems described herein.

In the non-limiting example 300, the analytics server leverages clustering algorithms to identify a time-series model that matches attribute associated with node 311 and execute the identified model instead of executing multiple time-series models or a time-series model that is generated based on all nodes within the set of nodes 310. The analytics server uses the set of nodes 310 (existing users) to identify a future attribute for the node 311, who is a new user.

As illustrated, node 311 may not be a part of the set of nodes 310. Therefore, the analytics server may not have any (or have very limited) previous historical data regarding the node 311 stored within its database. For instance, node 311 may represent a new user for whom the analytics server has not monitored or gathered any data.

As depicted in FIGS. 3A and 3B, the analytics server may first execute various analytical and clustering algorithms on the set of nodes 310 to generate various groupings and then generate time-series models 330a-300n based on the clustered data. The analytics server may then identify a time-series model associated with the node 311 and may execute that time-series model to identify a future value of the node 311. Even though the example 300 describes that the clustering and model generating steps may be performed before receiving the request to identify the future value of node 311, the system and methods described herein may be performed in various orders and different sequences. For instance, in some configurations, the analytics server may cluster the nodes and generate prediction models in response to receiving a request to identify a future value of the node 311.

The analytics server may first retrieve the set of nodes 310 from an internal or external database. As described above, each node within the set of nodes 310 represents an existing customer and the analytics server may retrieve all attribute data associated each node. Leveraging cluster methodologies described above, the analytics server may the segment of nodes 310 into multiple clusters 320a-320n and 340a-340n. Each cluster may include users having similar attributes, such as the attributes of prior spend in previous three months, number of transactions in the previous six months, days since last transaction, demographic data (e.g., age, income, geographic location), and the like. Thus, the users in the same cluster have similar attributes.

The analytics server may cluster the nodes using a single or multiple dimensional clustering method. Therefore, the analytics server may generate multiple clusters. In the depicted example, the analytics server clusters the set of nodes 310 based on a first attribute (e.g., prior spend in previous 3 months) into clusters 320a-320n. The analytics server then also clusters the same nodes (set of nodes 310) based on a different attribute (e.g., income level) into clusters 340a-340n. In some configurations, the analytics server may cluster the set of nodes 310 into only one set of clusters where the clustering is based on multiple attributes (e.g., age, income, prior spent, and location).

Leveraging the modeling techniques described above, the analytics server may generate a time-series (or other prediction computer models) for each cluster of nodes. The analytics server generates the time-series model using data associated with its corresponding cluster. For instance, the analytics server generates the time-series model 330a based on data associated with nodes within the cluster 320a. Accordingly, the analytics server may generate time-series models 330a-330n where each time-series model corresponds to a cluster within clusters 320a-320n. Moreover, time-series models 350a-350n correspond to clusters 340a-340n. The analytics server may generate one time-series model per attribute and per cluster. For instance for cluster 320a, the analytics server may generate a first time-series model for time vs "money spent in the past three months," a second time-series model for time vs "number of transactions," and a third time-series model for time vs "amount per transaction." Therefore, the analytics server may generate a multitude of prediction models. Using the methods and systems described herein, the analytics server can efficiently identify a relevant model and only execute what is needed and not all models (or a holistic model that includes every node), as it has been conventionally done.

As depicted in FIG. 3B, when the analytics server receives a request to identify a future attribute of node 311, the analytics server may first retrieve all attributes associated with node 311. For instance, the analytics server may identify demographic data, spending habits, or any other data associated with the node 311. The analytics server may then identify one or more clusters associated with the node 311. In some embodiments, the analytics server may receive these attribute from the client computer 360 or query a third-party database. As described above, the analytics server may identify a cluster most similar to the attributes of the node 311. As depicted, the analytics server determines that node 311 is most similar to the nodes within cluster 320. Therefore, the analytics server retrieves and executes the time-series model 330a to display the results on the client computer 360.

In some configurations, the analytics server may cluster the set of nodes 310 based on the attributes associated with the node 311. For instance, if the analytics server receives a request to identify a future number of transactions per month for a new user whose income is $150,000 and lives in Texas, the analytics server may retrieve a set of users who live in Texas and segment the users into different clusters based on their respective income. Additionally or alternatively, the analytics server may cluster the set of nodes 310 based on attributes other that the attributes known for the node 311.

In some configurations, the analytics server may iteratively cluster the set of nodes 310 and generate the time-series models accordingly. For instance, the analytics server may first cluster the set of nodes 310 into a first set of clusters based on a first attribute (e.g., age) and then re-cluster the nodes within each first set of clusters into a second set of clusters based on a second attribute (e.g., income). The analytics server may then generate the time-series models for each cluster within the second set of clusters. For instance, each time-series model may only correspond to the set of nodes that have been clustered based on age and income. The analytics server may repeat the above-mentioned iterative clustering method as many times to achieve a more granular time-series model. Using the hierarchical (e.g., multi-layered) clustering described above, the analytics server may increase accuracy of the results.

Figure 4:
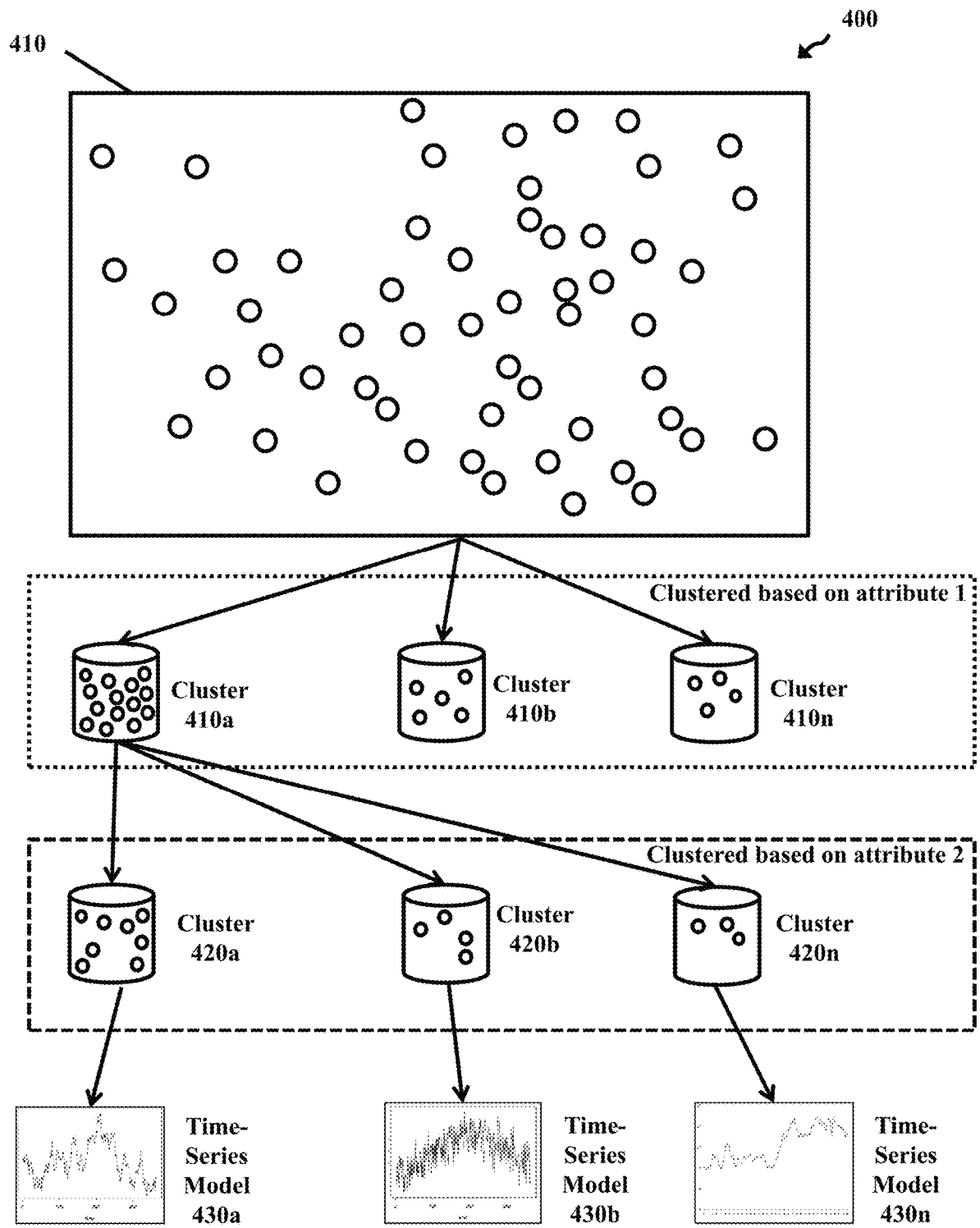
FIG. 4 illustrates a non-limiting example of a multi-layer clustering structure, according to an embodiment.

FIG. 4 depicts an example of iterative or multi-layered clustering, in accordance with an embodiment. In example 400, the analytics server clusters a set of nodes 410 into a first set of clusters 410a-410n based on a first attribute (e.g., age). The analytics server may then further cluster each cluster 410a-410n into a second set of clusters 420a-420n based on a second attribute (e.g., income). The analytics server may repeat the above-descried process multiple time, thereby generating a multi-layer clustering structure. The analytics server may then generate prediction models for each cluster 410a-410n (or the last layer of the multi-layer clustering structure), such as the time-series models 430a-430n. For clarity, FIG. 4 only depicts a two-layer clustering structure. In some configurations, the number of layers and the attributes may correspond to known attributes associated with the new user (e.g., node 311 in FIG. 3). For instance, if the analytics server retrieves age, location, and education, the analytics server may cluster the set of nodes based on age (first layer), location (second layer), and education (third layer).

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

When implemented in hardware, the functionality may be implemented within circuitry of a wireless signal processing circuit that may be suitable for use in a wireless receiver or mobile device. Such a wireless signal processing circuit may include circuits for accomplishing the signal measuring and calculating steps described in the various embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

Any reference to claim elements in the singular, for example, using the articles "a," "an" or "the," is not to be construed as limiting the element to the singular.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method comprising:
executing, by a server, a clustering model to identify, using one or more attributes of a first node, a cluster of nodes within a set of clusters of nodes, each cluster of nodes comprising a subset of a set of nodes, the identified cluster of nodes corresponding to the first node;
executing, by the server, a prediction model of a set of prediction models corresponding to the identified cluster, the server inputting at least one value corresponding to the one or more attributes of the first node to calculate the future value of the first attribute for the first node each prediction model of the set of prediction models corresponding to a cluster of nodes within the set of clusters of nodes; and
populating, by the server, a graphical user interface with the calculated future value of the first attribute.

2. The method of claim 1, wherein the future value of the first attribute corresponds to a predicted number of transactions or amount of money spent by a user associated with the first node.

3. The method of claim 1, wherein the prediction model is a time-series prediction model.

4. The method of claim 1, wherein the clustering model utilizes a multi-dimensional distance algorithm to cluster the set of nodes.

5. The method of claim 1, wherein each prediction model is generated using only values associated with a single corresponding cluster.

6. The method of claim 1, wherein the one or more attribute comprises at least one of demographic data, transaction data, or account data.

7. The method of claim 1, wherein the server uses a k-clustering algorithm to generate the plurality of clusters.

8. A computer system comprising:
a computer-readable medium having a set of instructions that when executed cause a processor to:
execute a clustering model to identify, using one or more attributes of a first node, a cluster of nodes within a set of clusters of nodes, each cluster of nodes comprising a subset of a set of nodes, the identified cluster of nodes corresponding to the first node;
execute a prediction model of a set of prediction models corresponding to the identified cluster, the server inputting at least one value corresponding to the one or more attributes of the first node to calculate the future value of the first attribute for the first node each prediction model of the set of prediction models corresponding to a cluster of nodes within the set of clusters of nodes; and
populate a graphical user interface with the calculated future value of the first attribute.

9. The computer system of claim 8, wherein the future value of the first attribute corresponds to a predicted number of transactions or amount of money spent by a user associated with the first node.

10. The computer system of claim 8, wherein the prediction model is a time-series prediction model.

11. The computer system of claim 8, wherein the clustering model utilizes a multi-dimensional distance algorithm to cluster the set of nodes.

12. The computer system of claim 8, wherein each prediction model is generated using only values associated with a single corresponding cluster.

13. The computer system of claim 8, wherein the one or more attribute comprises at least one of demographic data, transaction data, or account data.

14. The computer system of claim 8, wherein the instructions cause the processor to use a k-clustering algorithm to generate the plurality of clusters.

15. A computer system comprising:
a computing device configured to present a graphical user interface; and
a server in communication with the computing device, the server configured to:
execute a clustering model to identify, using one or more attributes of a first node, a cluster of nodes within a set of clusters of nodes, each cluster of nodes comprising a subset of a set of nodes, the identified cluster of nodes corresponding to the first node;
execute a prediction model of a set of prediction models corresponding to the identified cluster, the server inputting at least one value corresponding to the one or more attributes of the first node to calculate the future value of the first attribute for the first node each prediction model of the set of prediction models corresponding to a cluster of nodes within the set of clusters of nodes; and
populate the graphical user interface with the calculated future value of the first attribute.

16. The computer system of claim 15, wherein the future value of the first attribute corresponds to a predicted number of transactions or amount of money spent by a user associated with the first node.

17. The computer system of claim 15, wherein the prediction model is a time-series prediction model.

18. The computer system of claim 15, wherein the clustering model utilizes a multi-dimensional distance algorithm to cluster the set of nodes.

19. The computer system of claim 15, wherein each prediction model is generated using only values associated with a single corresponding cluster.

20. The computer system of claim 15, wherein the one or more attribute comprises at least one of demographic data, transaction data, or account data.

* * * * *